(12) United States Patent
Ogura

(10) Patent No.: US 7,210,350 B2
(45) Date of Patent: May 1, 2007

(54) VIBRATING GYRO ELEMENT, SUPPORT STRUCTURE OF VIBRATING GYRO ELEMENT, AND GYRO SENSOR

(75) Inventor: Seiichiro Ogura, Minowa-machi (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 11/329,692

(22) Filed: Jan. 10, 2006

(65) Prior Publication Data
US 2006/0107740 A1   May 25, 2006

(30) Foreign Application Priority Data
Jan. 24, 2005  (JP) ............ 2005-015455

(51) Int. Cl.
*G01P 9/04* (2006.01)
*G01N 29/00* (2006.01)

(52) U.S. Cl. ............... 73/504.12; 73/504.16

(58) Field of Classification Search ............ 73/504.04, 73/504.12, 504.14, 504.15, 504.16; 310/370
See application file for complete search history.

(56) References Cited

U.S. PATENT DOCUMENTS 5,476,008 A * 12/1995 Pinson .............. 73/504.16
6,439,051 B2 * 8/2002 Kikuchi et al. .......... 73/504.12
6,698,292 B2 * 3/2004 Kikuchi .............. 73/662
7,043,986 B2 * 5/2006 Kikuchi et al. .......... 73/504.12

FOREIGN PATENT DOCUMENTS

JP     2001-012955     1/2001

* cited by examiner

*Primary Examiner*—Helen Kwok
(74) *Attorney, Agent, or Firm*—Anderson Kill & Olick, PC (57) ABSTRACT

A vibrating gyro element includes in the same plane a base portion; a pair of vibrating arms for detection extended out of the base portion on both sides in a straight line shape; a pair of connecting arms extended-out from the base portion onto both sides in directions perpendicular to the vibrating arms for detection; a pair of vibrating arms for driving each extended-out from the tip portion of each of the connecting arms to both sides perpendicularly to this tip portion; four beams extended out of the base portion; and a support portion connected to the tip of each of the beams; wherein each of the beams is once extended out of the base portion in a direction approximately perpendicular to the extending-out direction of the vibrating arm for driving.

5 Claims, 7 Drawing Sheets

VIBRATING GYRO ELEMENT, SUPPORT STRUCTURE OF VIBRATING GYRO ELEMENT, AND GYRO SENSOR

BACKGROUND

1. Technical Field

The present invention relates to a vibrating gyro element, a support structure of the vibrating gyro element, and a gyro sensor used in the detection of an angular velocity.

2. Related Art

In recent years, the gyro sensor having the vibrating gyro element stored in a container is largely used as a manual moving correction of an image pickup device, posture control of a mobile navigation system of a vehicle, etc. using a GPS satellite signal.

Figure 1:
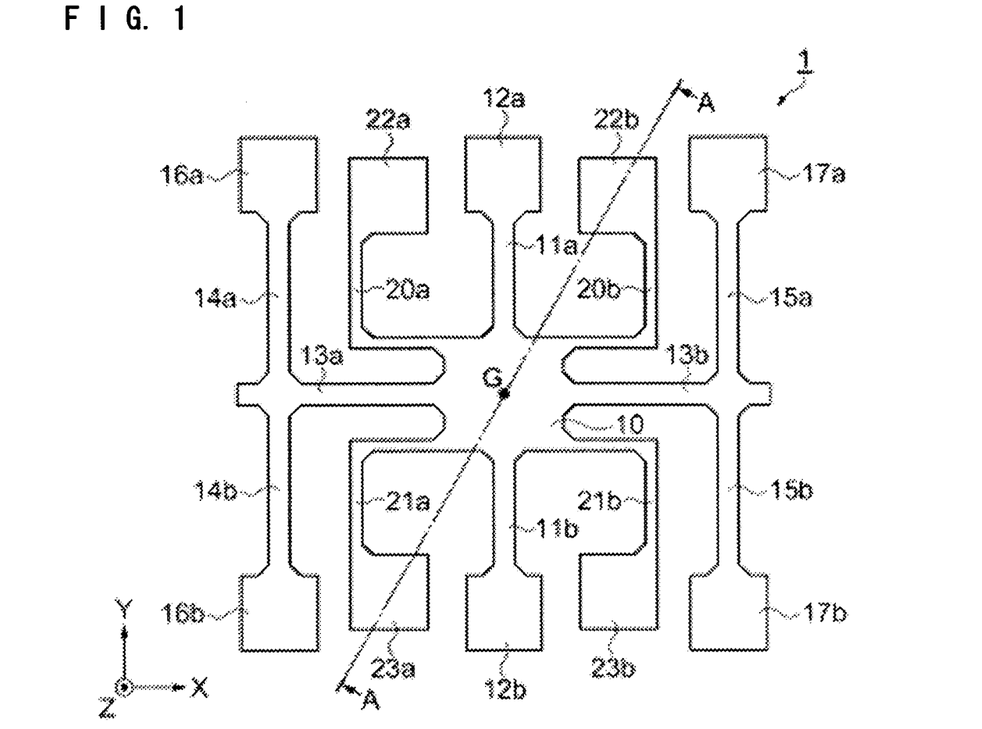
FIG. 1 is a schematic plan view showing a vibrating gyro element of this embodiment mode.

For example, a so-called double T-type vibrating gyro element is known as the vibrating gyro element in JP-A-2001-12955 and FIG. 1. In this double T-type vibrating gyro element, a detecting vibrating system extended out of a central base portion, and a driving vibrating system of about the T-type are arranged in the central base portion so as to be symmetrical leftward and rightward.

In such a double T-type vibrating gyro element, a problem exists in that a driving vibration is leaked to the base portion, and a micro vibration is given to the detecting vibrating system extended out of the base portion, and distortion due to this vibration is detected as the angular velocity even in a state in which no angular velocity is applied.

SUMMARY

An advantage of some aspects of the invention is to provide a vibrating gyro element, a support structure of the vibrating gyro element, and a gyro sensor for suppressing the driving vibration leaked to the base portion in the vibrating gyro element, and preventing an error in the detection of the angular velocity.

To achieve the above advantage, a vibrating gyro element of the invention comprises in the same plane:

a base portion;

a pair of vibrating arms for detection extended out of the base portion on both sides in a straight line shape;

a pair of connecting arms extended-out from the base portion onto both sides in directions perpendicular to the vibrating arms for detection;

a pair of vibrating arms for driving each extended-out from the tip portion of each of the connecting arms to both sides perpendicularly to this tip portion;

four beams extended out of the base portion; and a support portion connected to the tip of each of the beams;

wherein each of the beams is once extended out of the base portion in a direction approximately perpendicular to the extending-out direction of the vibrating arm for driving.

In accordance with this construction, a leaked driving vibration can be suppressed and an error in the detection of the angular velocity can be prevented by the beam extended out of the base portion in the direction approximately perpendicular to the extending-out direction of the vibrating arm for driving.

In the vibrating gyro element of the invention, the beam and the support portion are desirably arranged in positions symmetrical in rotation with respect to the center of gravity of the vibrating gyro element.

In accordance with this construction, the balance of the vibrating gyro element can be secured, and a stable posture can be held.

A support structure of a vibrating gyro element of the invention comprises:

the above vibrating gyro element;

a support base for placing the vibrating gyro element thereon; and a fixing member for fixing the support portion of the vibrating gyro element and the support base.

In accordance with this support structure, the leaked driving vibration can be suppressed, and an error in the detection of the angular velocity can be prevented.

In the support structure of the vibrating gyro element of the invention, the fixing member is desirably constructed by a material having elasticity.

In accordance with this construction, since the fixing member has elasticity, the vibration or an impact from the exterior is relaxed, and the driving vibration and the detecting vibration of the vibrating gyro element can be stably held. With respect to a micro vibration coming to be leaked to the support portion, the fixing member functions as a buffer material, and an influence on the driving vibration and the detecting vibration can be reduced.

A gyro sensor of the invention comprises:

the above vibrating gyro element;

a support base for placing the vibrating gyro element thereon;

a fixing member for fixing the support portion of the vibrating gyro element and the support base;

a driving circuit for operating and vibrating the vibrating gyro element; and a detecting circuit for detecting a detecting vibration caused in the vibrating gyro element when an angular velocity is applied to the vibrating gyro element.

In accordance with this construction, it is possible to provide a gyro sensor which mounts the vibrating gyro element for suppressing the driving vibration leaked to the base portion and preventing an error in the detection of the angular velocity, and has excellent characteristics.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiment modes for embodying the invention will next be explained in accordance with the drawings.

Embodiment Mode

FIG. 1 is a schematic plan view showing a vibrating gyro element of this embodiment mode.

The vibrating gyro element 1 is formed by crystal as a piezoelectric material. The crystal has an X-axis called an electric axis, a Y-axis called a mechanical axis, and a Z-axis called an optical axis. The vibrating gyro element 1 has a predetermined thickness in the Z-axis direction, and is formed within an XY plane.

The vibrating gyro element 1 has a pair of vibrating arms 11a, 11b for detection extended out of a base portion 10 in a straight line shape on both the upper and lower sides within FIG. 1, and also has a pair of connecting arms 13a, 13b extended out of the base portion 10 on both the left and right sides within FIG. 1 in a direction perpendicular to the vibrating arms 11a, 11b for detection. The vibrating gyro element 1 further has pairs of left and right vibrating arms 14a, 14b, 15a, 15b for driving extended out of the tip portions of the respective connecting arms 13a, 13b on both the upper and lower sides within FIG. 1 in parallel with the vibrating arms 11a, 11b for detection.

Further, unillustrated detecting electrodes are formed on the surfaces of the vibrating arms 11a, 11b for detection. Unillustrated driving electrodes are formed on the surfaces of the vibrating arms 14a, 14b, 15a, 15b for driving. Thus, a detecting vibrating system for detecting an angular velocity is constructed by the vibrating arms 11a, 11b for detection. A driving vibrating system for operating the vibrating gyro element is constructed by the connecting arms 13a, 13b and the vibrating arms 14a, 14b, 15a, 15b for driving.

Weight portions 12a, 12b are formed in the respective tip portions of the vibrating arms 11a, 11b for detection. Weight portions 16a, 16b, 17a, 17b are formed in the respective tip portions of the vibrating arms 14a, 14b, 15a, 15b for driving. Thus, the vibrating gyro element is made compact and detecting sensitivity of the angular velocity is improved. Here, the vibrating arms 11a, 11b for detection are terms respectively including the weight portions 12a, 12b, and the vibrating arms 14a, 14b, 15a, 15b for driving are terms respectively including the weight portions 16a, 16b, 17a, 17b.

Further, beams 20a, 20b, 21a, 21b of an L-shape are formed so as to be once extended out of the base portion 10 on both the left and right sides within FIG. 1 in a direction approximately perpendicular to the vibrating arms 14a, 14b, 15a, 15b for driving, and be intermediately extended out in parallel with the vibrating arms 14a, 14b, 15a, 15b for driving. The tips of the beams 20a, 20b, 21a, 21b are respectively connected to support portions 22a, 22b, 23a, 23b.

The vibrating gyro element 1 can be supported by supporting and adhering these support portions 22a, 22b, 23a, 23b.

These beams 20a, 20b, 21a, 21b and the support portions 22a, 22b, 23a, 23b are arranged in positions symmetrical in rotation with respect to the gravity center G of the vibrating gyro element 1.

The operation of the vibrating gyro element 1 will next be explained.

Figure 2:
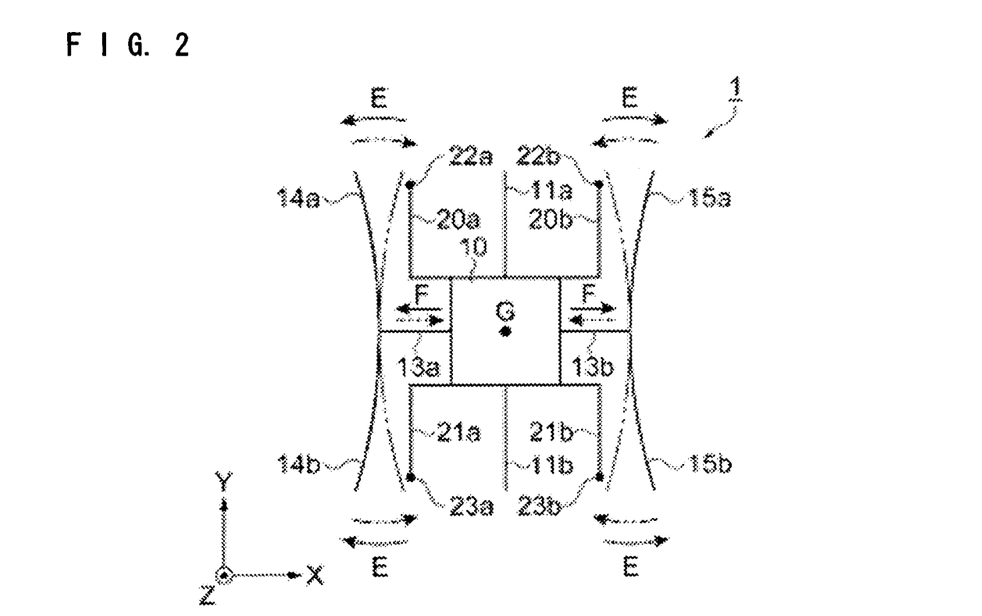
FIG. 2 is a typical plan view for explaining a driving vibrating state of the vibrating gyro element.

FIGS. 2 and 3 are typical plan views for explaining the operation of the vibrating gyro element 1. FIG. 2 shows a driving vibrating state. FIG. 3 shows a detecting vibrating state in an applying state of the angular velocity. In FIGS. 2 and 3, each vibrating arm and each beam are shown by lines to simply represent a vibrating mode.

In FIG. 2, the driving vibrating mode of the vibrating gyro element 1 will be explained. In a state in which no angular velocity is applied to the vibrating gyro element 1, the vibrating arms 14a, 14b, 15a, 15b for driving perform a bending vibration in the direction shown by an arrow E. In this bending vibration, a vibrating mode shown by a solid line and a vibrating mode shown by a two-dotted chain line are repeated at a predetermined frequency. At this time, force as shown by an arrow F is applied to the base portion 10. Namely, a vibration for alternately applying tensile force and compression force is applied to the base portion 10 in accordance with the bending vibration of the vibrating arms 14a, 14b, 15a, 15b for driving. This vibration is a micro vibration in comparison with the bending vibration of the vibrating arms 14a, 14b, 15a, 15b for driving.

When left and right vibrations are unbalanced, this micro vibration acts so as to rotate the base portion 10 and the vibrating arms 11a, 11b for detection are intended so as to be slightly vibrated. However, the vibration of the base portion 10 is suppressed by the beams 20a, 20b, 21a, 21b once extended out of the base portion 10 in a direction perpendicular to the vibrating arms 14a, 14b, 15a, 15b for driving. Therefore, no vibrating arms 11a, 11b for detection are vibrated.

Figure 3A:
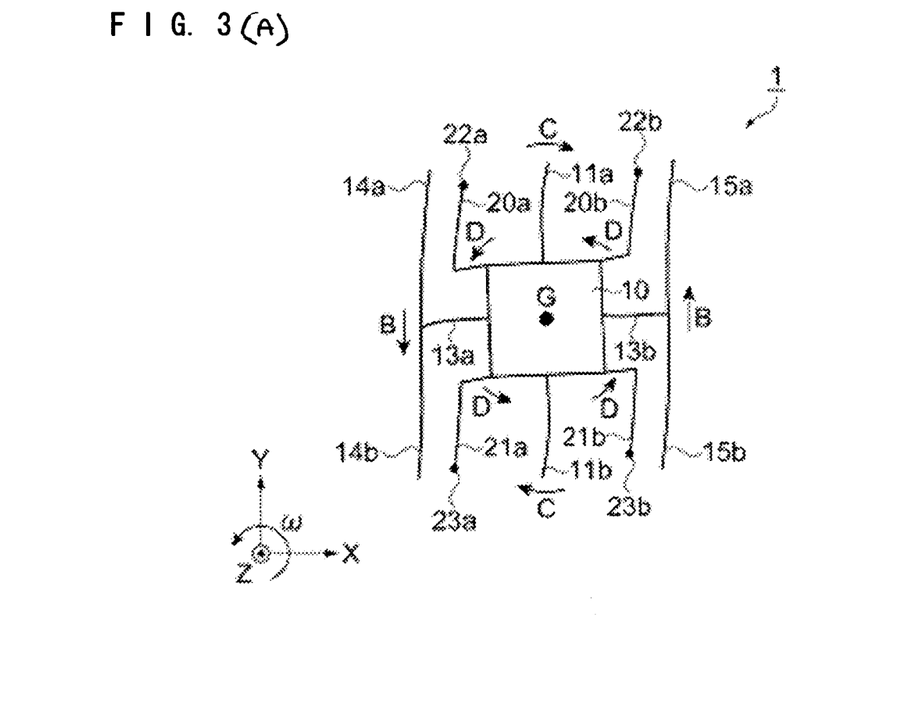
FIG. 3 is a typical plan view for explaining a detecting vibrating state of the vibrating gyro element.
Figure 3B:
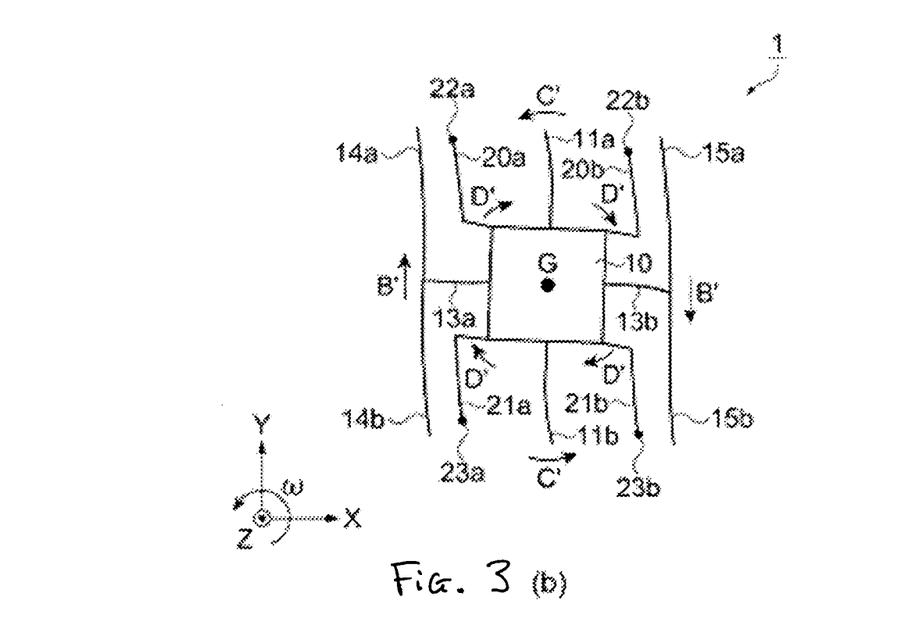

Next, in a state in which this driving vibration is performed, the vibration as shown in FIG. 3 is performed when the angular velocity ω around the Z-axis is applied to the vibrating gyro element 1. First, as shown in FIG. 3A, Coriolis force in the direction of an arrow B is applied to the vibrating arms 14a, 14b, 15a, 15b for driving and the connecting arms 13a, 13b constituting the driving vibrating system. Simultaneously, the vibrating arms 11a, 11b for detection are deformed in the direction of an arrow C in accordance with the Coriolis force of the arrow B. Thereafter, as shown in FIG. 3B, force returned in the direction of an arrow B' is applied to the vibrating arms 14a, 14b, 15a, 15b for driving and the connecting arms 13a, 13b. Simultaneously, the vibrating arms 11a, 11b for detection are deformed in the direction of an arrow C' in accordance with the force of the arrow B' direction. This movement is alternately repeated and a new vibration is excited.

The vibrations in the directions of the arrows B, B' are circumferential vibrations with respect to the gravity center G. A detecting electrode formed in the vibrating arms 11a, 11b for detection then detects the distortion of a piezoelectric material generated by the vibration, and the angular velocity is calculated.

In this detecting vibrating state, the beams 20a, 20b, 21a, 21b are flexed in a peripheral portion of the base portion 10, and are vibrated in the circumferential direction with respect to the gravity center G in the directions of arrows D, D'. This is because the detecting vibration becomes a balance vibration including the base portion 10 as well as the balance vibration of the driving vibrating system and the vibrating arms 11a, 11b for detection.

The vibrating amplitude of the peripheral portion of the base portion 10 shown by these arrows D, D' is very small in comparison with the vibrating amplitude of the driving vibrating system shown by arrows B, B', or the vibrating amplitudes of the vibrating arms 11a, 11b for detection shown by arrows C, C'. However, for example, when the base portion 10 is fixed, the vibration of the peripheral portion of the base portion 10 is suppressed by this fixation, and the detecting vibration is also suppressed. Thus, detecting sensitivity of the angular velocity is reduced by fixing the base portion 10.

Figure 4:
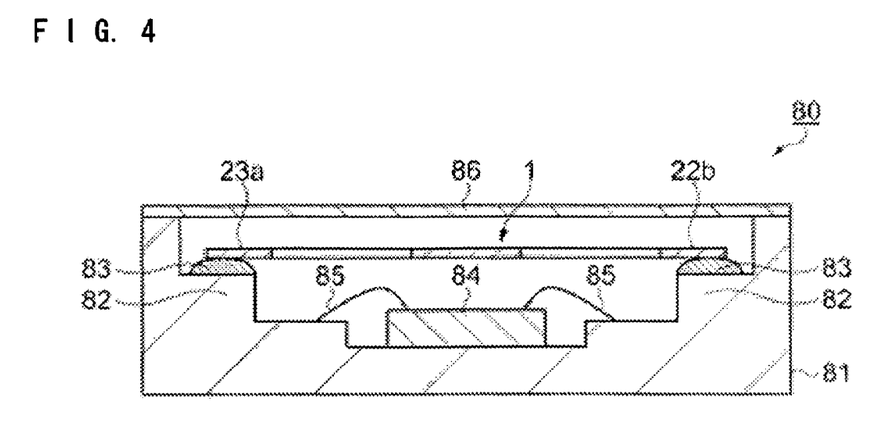
FIG. 4 is a schematic sectional view showing a gyro sensor.

The support structure of the vibrating gyro element and the gyro sensor will next be explained by using FIG. 4. FIG. 4 is a schematic sectional view showing the gyro sensor, and the vibrating gyro element 1 is shown in section along a cutting line A—A of FIG. 1.

The gyro sensor 80 has the vibrating gyro element 1, an IC 84, a storing container 81 and a cover body 86. The IC 84 is arranged on the bottom face of the storing container 81 formed by ceramic, etc., and is electrically connected to unillustrated wiring formed in the storing container 81 by a wire 85 of Au, etc. The IC 84 includes a driving circuit for operating and vibrating the vibrating gyro element 1, and a detecting circuit for detecting the detecting vibration caused in the vibrating gyro element 1 when the angular velocity is applied. In the vibrating gyro element 1, a support base 82 formed in the storing container 81, and support portions 22a, 22b, 23a, 23b of the vibrating gyro element 1 are adhered and supported through a fixing member 83 such as an electrically conductive adhesive, etc. Further, unillustrated wiring is formed on the surface of the support base 82, and the electrode of the vibrating gyro element 1 and the wiring are conducted through the fixing member 83. This fixing member 83 is desirably constructed by a material having elasticity. An electrically conductive adhesive, etc. having silicon as a base material are known as the fixing member 83 having elasticity. The interior of the storing container 81 is held in the atmosphere of a vacuum in the upper portion of the storing container 81, and is sealed by the cover body 86.

As mentioned above, the vibrating gyro element 1 of this embodiment mode and the support structure of the vibrating gyro element 1 can suppress the leaked driving vibration by the beams 20a, 20b, 21a, 21b once extended out of the base portion 10 in directions approximately perpendicular to the extending-out directions of the vibrating arms 14a, 14b, 15a, 15b for driving, and can prevent an error in the detection of the angular velocity.

Further, since the beams 20a, 20b, 21a, 21b extended out of the base portion 10 are formed by crystal in the detecting vibration, the beams 20a, 20b, 21a, 21b have elasticity and no vibration of the peripheral portion of the base portion 10 is suppressed and no detecting sensitivity of the angular velocity is reduced.

Further, the beams 20a, 20b, 21a, 21b and the support portions 22a, 22b, 23a, 23b are arranged in positions symmetrical in rotation with respect to the gravity center G of the vibrating gyro element 1. Accordingly, the balance of the vibrating gyro element 1 can be secured, and a stable posture can be held and preferable characteristics can be obtained.

Further, in the support structure of the vibrating gyro element 1, the fixing member 83 is constructed by a material having elasticity. Therefore, a vibration and an impact from the exterior can be relaxed, and the driving vibration and the detecting vibration can be stably held. With respect to the micro vibration coming to be leaked to the support portions 22a, 22b, 23a, 23b, the fixing member 83 functions as a buffer material and an influence onto the driving vibration and the detecting vibration can be reduced.

Further, in the gyro sensor 80 mounting the vibrating gyro element 1 supported by the above support structure, the vibrating gyro element 1 for preventing an error in the detection of the angular velocity is mounted. It is also possible to provide the gyro sensor 80 having excellent characteristics.

Modified Examples of Vibrating Gyro Element

FIGS. 5 to 9 are schematic plan views showing modified examples of the vibrating gyro element. These modified examples have features in the shapes of the beam and the support portion shown in FIG. 1, and the same constructional portions as FIG. 1 are designated by the same reference numerals, and their explanations are omitted.

Figure 5:
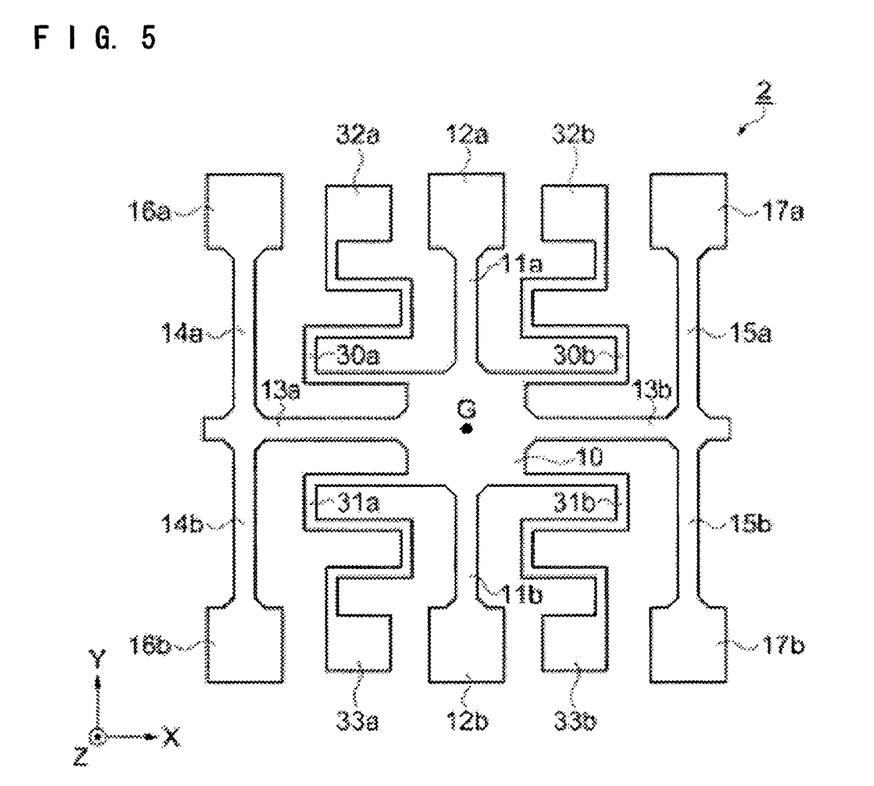
FIG. 5 is a schematic plan view showing a modified example of the vibrating gyro element.

In FIG. 5, in a vibrating gyro element 2, beams 30a, 30b, 31a, 31b approximately formed in an S-shape are once extended out of the corner portions of four places of the base portion 10 in directions approximately perpendicular to the respective vibrating arms 14a, 14b, 15a, 15b for driving. The tips of the beams 30a, 30b, 31a, 31b are respectively connected to support portions 32a, 32b, 33a, 33b.

The vibrating gyro element 2 has a support structure similar to that of the above embodiment mode, and the support portions 32a, 32b, 33a, 33b are adhered and supported in a support base by a fixing member such as an electrically conductive adhesive, etc.

Figure 6:
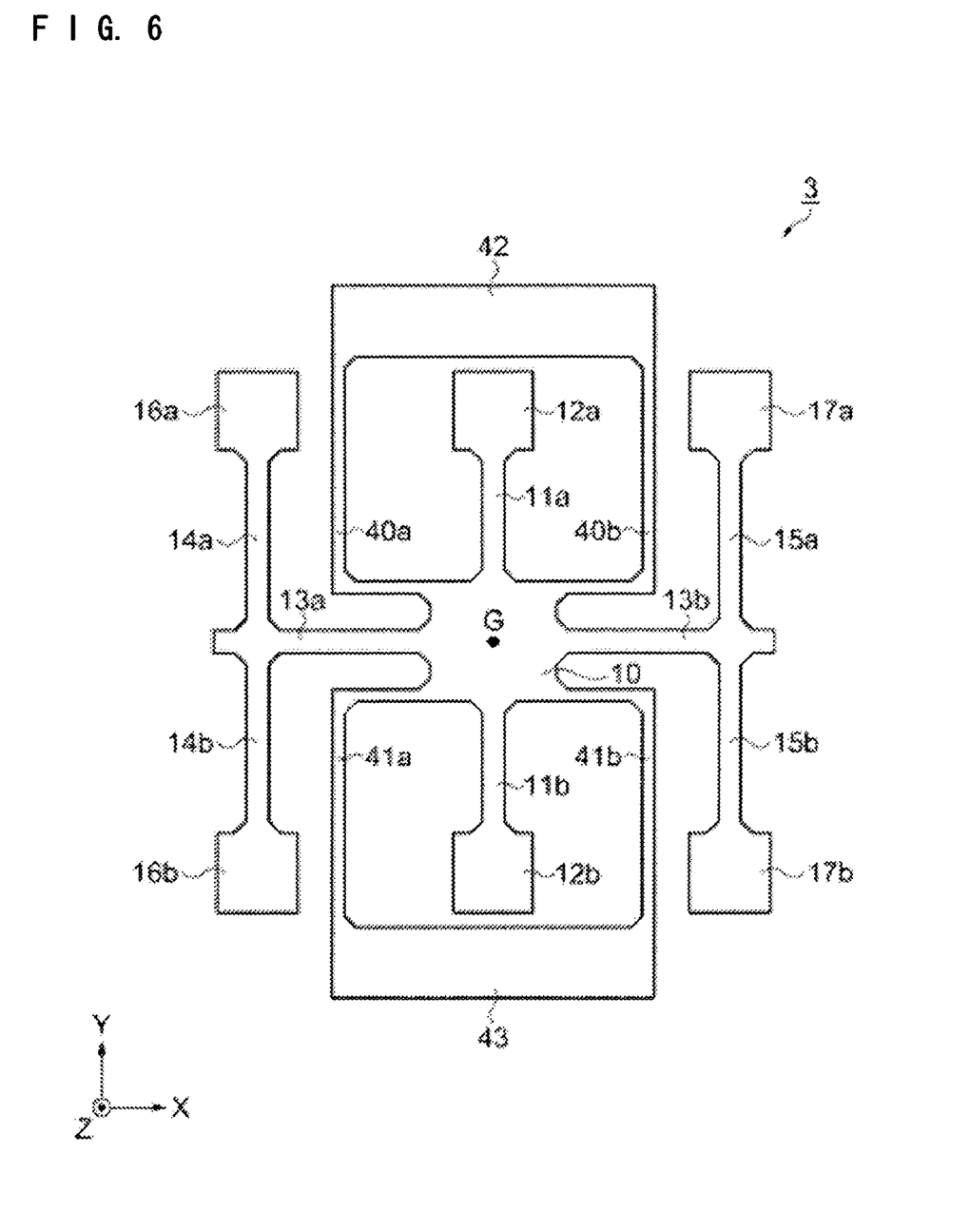
FIG. 6 is a schematic plan view showing a modified example of the vibrating gyro element.

Next, in FIG. 6, in a vibrating gyro element 3, beams 40a, 40b, 41a, 41b of an L-shape are arranged so as to be extended out of the corner portions of four places of the base portion 10 on both the left and right sides within FIG. 6 in directions approximately perpendicular to the vibrating arms 14a, 14b, 15a, 15b for driving, and be intermediately extended out in parallel with the vibrating arms 14a, 14b, 15a, 15b for driving. Both the tips of the beams 40a, 40b are connected to a support portion 42, and both the beams 41a and 41b are connected to a support portion 43.

The vibrating gyro element 3 has a support structure similar to that of the above embodiment mode, and the support portions 42, 43 are adhered and supported in a support base by a fixing member such as an electrically conductive adhesive, etc.

Figure 7:
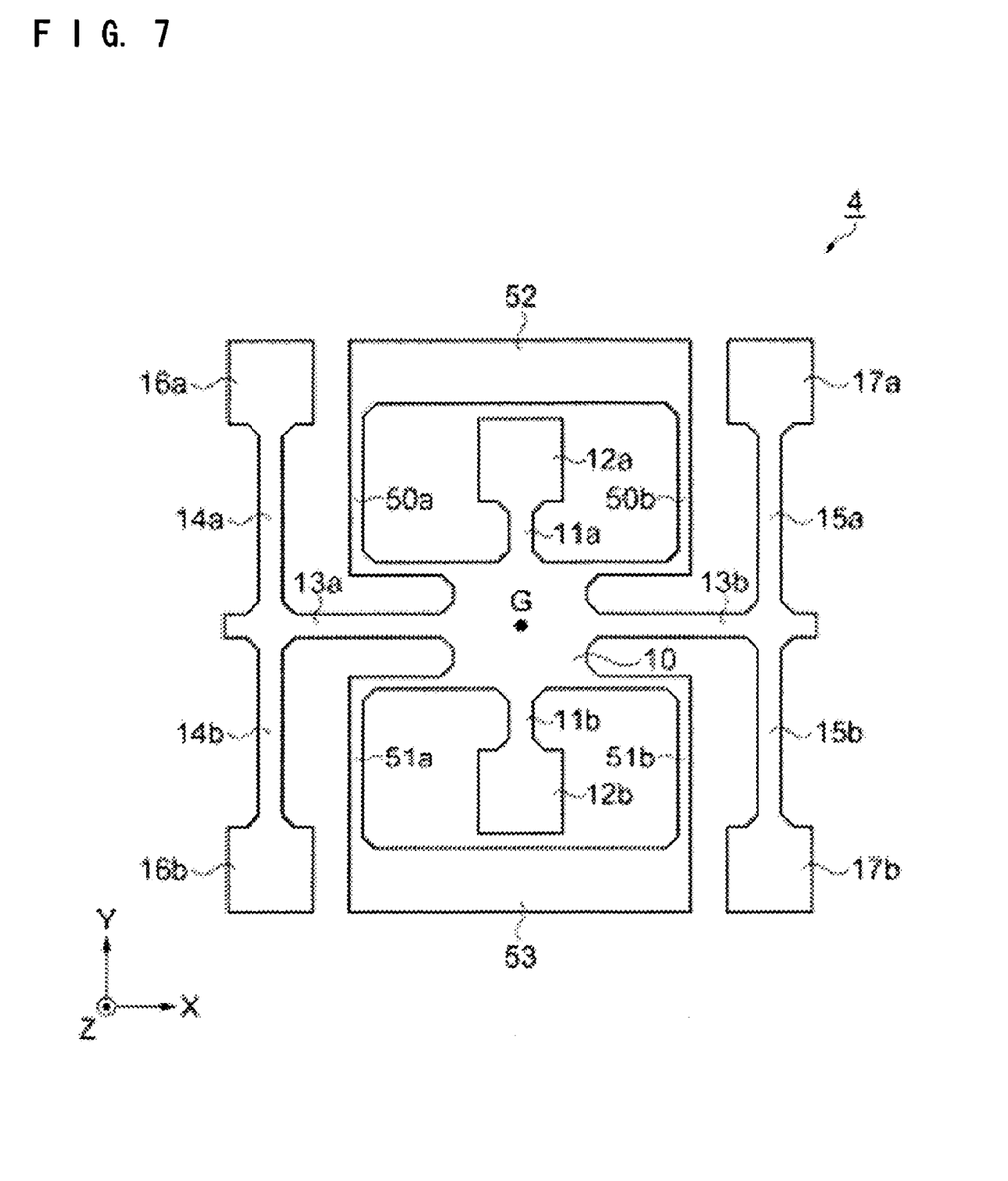
FIG. 7 is a schematic plan view showing a modified example of the vibrating gyro element.

FIG. 7 shows a modified example when the vibrating arms 11a, 11b for detection in FIG. 6 are further shortly formed. In FIG. 7, in a vibrating gyro element 4, beams 50a, 50b, 51a, 51b of an L-shape are arranged so as to be extended out of the corner portions of four places of the base portion 10 on both the left and right sides within FIG. 7 in directions approximately perpendicular to the vibrating arms 14a, 14b, 15a, 15b for driving, and be intermediately extended out in parallel with the vibrating arms 14a, 14b, 15a, 15b for driving. The tips of the beams 50a, 50b are connected to a support portion 52, and the beams 51a, 51b are connected to a support portion 53.

This pair of support portions 52, 53 are arranged outside the vibrating arms 11a, 11b for detection between the vibrating arms 14a, 14b, 15a, 15b for driving in the extending-out directions of the respective vibrating arms 11a, 11b for detection.

The vibrating gyro element 4 has a support structure similar to that of the above embodiment mode, and the support portions 52, 53 are adhered and supported in a support base by a fixing member such as an electrically conductive adhesive, etc.

Figure 8:
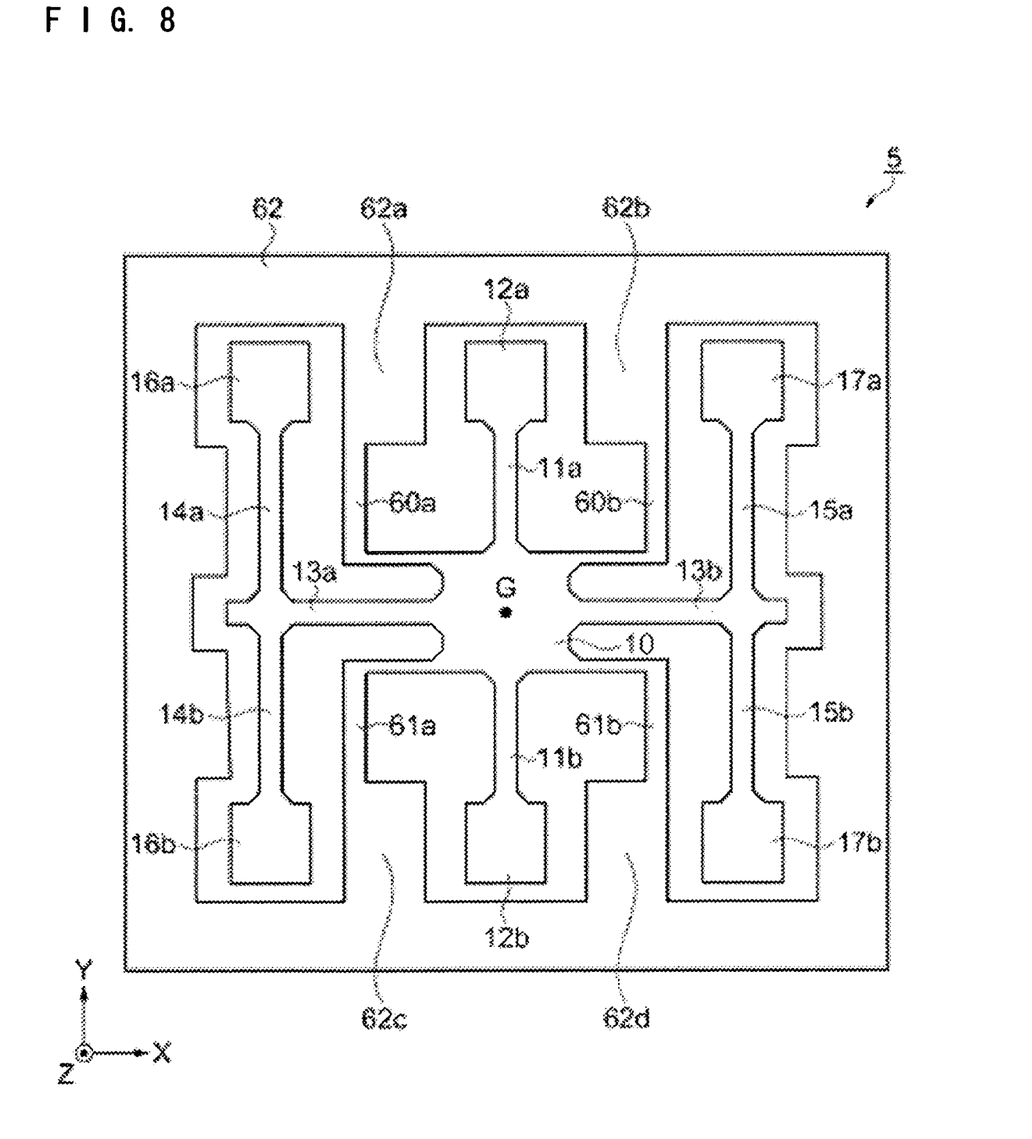
FIG. 8 is a schematic plan view showing a modified example of the vibrating gyro element.

In FIG. 8, in a vibrating gyro element 5, beams 60a, 60b, 61a, 61b of an L-shape are arranged so as to be extended out of the corner portions of four places of the base portion 10 on both the left and right sides within FIG. 8 in directions approximately perpendicular to the vibrating arms 14a, 14b, 15a, 15b for driving, and be intermediately extended out in parallel with the vibrating arms 14a, 14b, 15a, 15b for driving. The beams 60a, 60b, 61a, 61b are respectively connected to support portions 62a, 62b, 62c, 62d. Further, the support portions 62a, 62b, 62c, 62d are connected to a frame portion 62 formed so as to surround the base portion 10, the vibrating arms 11a, 11b for detection and the vibrating arms 14a, 14b, 15a, 15b for driving.

The vibrating gyro element 5 has a support structure similar to that of the above embodiment mode, and at least the support portions 62a, 62b, 62c, 62d or the frame portion 62 is adhered and supported in a support base by a fixing member such as an electrically conductive adhesive, etc.

Figure 9:
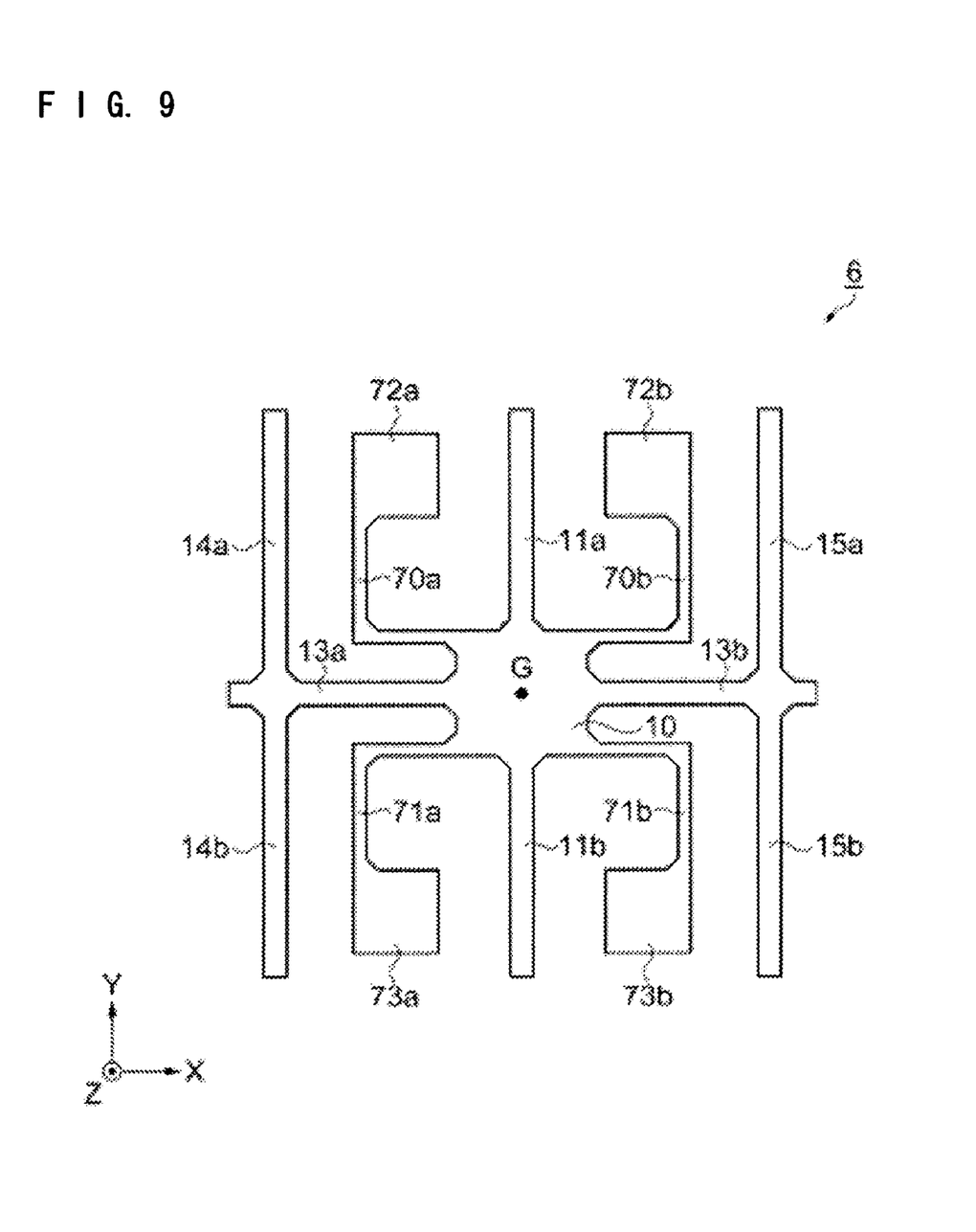
FIG. 9 is a schematic plan view showing a modified example of the vibrating gyro element.

FIG. 9 shows a mode in which no weight portions 12a, 12b, 16a, 16b, 17a, 17b are arranged in the vibrating gyro element 1 explained in FIG. 1.

In FIG. 9, in a vibrating gyro element 6, beams 70a, 70b, 71a, 71b of an L-shape are arranged so as to be extended out of the corner portions of four places of the base portion 10 on both the left and right sides within FIG. 9 in directions approximately perpendicular to the vibrating arms 14a, 14b, 15a, 15b for driving, and be intermediately extended out in parallel with the vibrating arms 14a, 14b, 15a, 15b for driving. The beams 70a, 70b, 71a, 71b are respectively connected to support portions 72a, 72b, 73a, 73b.

The vibrating gyro element 6 has a support structure similar to that of the above embodiment mode, and the support portions 72a, 72b, 73a, 73b are adhered and supported in a support base by a fixing member such as an electrically conductive adhesive, etc.

In the above modified examples of the vibrating gyro element, the leaked driving vibration can be suppressed and an error in the detection of the angular velocity can be prevented by the beams once extended out of the base portion 10 in the directions approximately perpendicular to the vibrating arms for driving.

Further, although the crystal as a material of the vibrating gyro element has a proper elastic property, the elastic property of the beam can be adjusted by suitably changing the length and shape of the beam extended out of the base portion 10. Thus, the suppression of the vibration transmitted to the base portion 10 can be adjusted, and stable driving vibration and detecting vibration can be obtained.

Thus, actions similar to those explained in this embodiment mode are also provided and similar effects can be also obtained in the modified examples of the vibrating gyro element.

The vibrating gyro element of this embodiment mode can be integrally formed by etching processing using a photolithography technique, and many vibrating gyro elements can be formed from one crystal wafer.

Further, in this embodiment mode, the beam is once extended out of the base portion approximately perpendicularly to the vibrating arm for driving, and is intermediately arranged in parallel with the vibrating arm for driving. However, the beam may be also arranged so as to have a certain angle with respect to the vibrating arm for driving instead of the construction in which the beam is intermediately arranged in parallel with the vibrating arm for driving, and may be also constructed so as to have elasticity as the beam.

Lithium tantalate ($LiTaO_3$) or lithium niobate ($LiNbO_5$), etc. as another piezoelectric material may be also utilized as the material of the vibrating gyro element. Further, the vibrating gyro element can be also embodied by using a perpetuating elastic material represented by an elinvar material as well as the piezoelectric material. The entire disclosure of Japanese Patent Application No. 2005-015455 filed Jan. 24, 2005 is expressly incorporated by reference herein.

What is claimed is:

1. A vibrating gyro element comprising in the same plane:
    a base portion having opposite ends with opposite corners on each of the opposite ends and having opposite sides;
    a pair of vibrating arms for detection extended out of the base portion from both ends in a straight line shape;
    a pair of connecting arms extended-out from the base portion from said opposite sides in directions perpendicular to the vibrating arms for detection;
    additional pairs of vibrating arms for driving with each pair extending out from a tip portion of each of the connecting arms in a direction parallel to the pair of vibrating arms;
    four beams extending out from the opposite corners on both ends of the base portion with each beam having a configuration substantially conforming to the letter "S"; and
    a support portion connected to the tip portion of each each of the beams;
    wherein each of the beams is once extended out of the base portion in a direction approximately perpendicular to the extending-out direction of the pair of connecting arms.

2. The vibrating gyro element according to claim 1 wherein the beams and the support portions are arranged in positions symmetrical in rotation with respect to the center of gravity of the vibrating gyro element.

3. A support structure of a vibrating gyro element comprising:
    the vibrating gyro element according to claim 1
    a support base for placing the vibrating gyro element thereon; and
    a fixing member for fixing the support portion of the vibrating gyro element and the support base.

4. The support structure of the vibrating gyro element according to claim 3, wherein the fixing member is constructed by a material having elasticity.

5. A gyro sensor comprising:
    the vibrating gyro element according to claim 1;
    a support base for placing the vibrating gyro element thereon;
    a fixing member for fixing the support portion of the vibrating gyro element and the support base;
    a driving circuit for operating and vibrating the vibrating gyro element; and
    a detecting circuit for detecting a detecting vibration caused in the vibrating gyro element when an angular velocity is applied to the vibrating gyro element.

* * * * *